ELECTRICAL COMPONENT FEEDING APPARATUS

Filed Aug. 23, 1966

5 Sheets-Sheet 1

INVENTOR
ALBERT W. ZEMEK

BY Fidelman & Wolffe

ATTORNEY

Aug. 1, 1967 A. W. ZEMEK 3,333,673

ELECTRICAL COMPONENT FEEDING APPARATUS

Filed Aug. 23, 1966

5 Sheets-Sheet 2

INVENTOR

ALBERT W. ZEMEK

BY Fidelman & Wolffe

ATTORNEY

ELECTRICAL COMPONENT FEEDING APPARATUS

Filed Aug. 23, 1966

INVENTOR

ALBERT W. ZEMEK

BY Fidelman & Wolffe

ATTORNEY

INVENTOR
ALBERT W. ZEMEK
BY Fidelman & Wolffe
ATTORNEY

Aug. 1, 1967 A. W. ZEMEK 3,333,673

ELECTRICAL COMPONENT FEEDING APPARATUS

Filed Aug. 23, 1966 5 Sheets-Sheet 5

INVENTOR

ALBERT W. ZEMEK

BY Fidelman & Wolffe

ATTORNEY

United States Patent Office 3,333,673

Patented Aug. 1, 1967

3,333,673

ELECTRICAL COMPONENT FEEDING APPARATUS

Albert W. Zemek, Binghamton, N.Y., assignor to Universal Instruments Corporation, Binghamton, N.Y., a corporation of New York Filed Aug. 23, 1966, Ser. No. 574,404

14 Claims. (Cl. 198—19)

ABSTRACT OF THE DISCLOSURE

An apparatus for use in the feeding of electrical components with respect to a component processing station which comprises means to guide components along a path of travel past the station in a predetermined component lead processing orientation, a component transfer bar having a plurality of component engaging surface portions defined by cut-outs equally spaced along an edge of the transfer bar aligned with the path of travel, and means to move the transfer bar with respect to the guide means in such a manner that the component engaging surface portions are sequentially moved from a first position in a first direction aligned with the guide means to transfer the components a predetermined distance along the path of travel, withdrawn from engagement with the components, moved in a direction opposite to the first direction a distance equal to the predetermined distance and returned to the first position in engagement with the components. The component guide is adapted to positively maintain components in oriented, relatively spaced apart position along the path of travel when the surface portions of the transfer bar are removed from engagement with the components, thereby permitting operation of the apparatus to be independent of the inclination of the path of component travel with respect to horizontal.

The present invention relates to an apparatus for feeding electrical components between component processing stations and more particularly to a rigid component transfer bar employed to positively move components between spaced processing stations and to positively retain the components at each station during processing thereof.

Various types of apparatus have been proposed to facilitate movement of electrical components between processing stations of component handling and processing equipment and to accurately position the components adjacent each of such stations. To a great extent the type of component transporting and positioning apparatus heretofore employed has depended upon the arrangement of the processing stations, as for instance whether the stations are disposed in spaced vertical or horizontal alignment. Conventionally, however, prior apparatus of which I am aware include a component transporting powered conveyor or a gravity feed chute and separate guide or component means which is associated one with each of the several processing stations and employed to position successive components presented by the conveyor in a desired processing orientation.

While many of the numerous prior apparatus perform well, each has one of several drawbacks, including size or complexity which leads to high cost of installation and maintenance, limited operating speeds, the inability to be selectively employed with equipment having processing stations in either vertical or horizontal alignment.

Accordingly, it is an object of the present invention to provide an electrical component feeding apparatus of simplified construction which is adapted to both positively transfer components between spaced processing stations and to positively retain successive components in a desired processing orientation adjacent to each station.

A further object is to provide a component feeding apparatus wherein a single movable component engaging member is employed to both transfer components between adjacent processing stations and to simultaneously position components adjacent each station in a predetermined processing orientation.

It is a further object of the present invention to provide a component feeding apparatus including a single movable component engaging member adapted to withdraw successive components from a supply, transfer the components to at least one processing station, maintain successively presented components in a proper predetermined orientation at such station and to thereafter transfer the process components to a point of collection or use.

A still further object of the present invention is to provide a component feeding apparatus adapted to positively withdraw successive components from a supply, positively feed the withdrawn components vertically downward in a spaced apart relationship passed at least one processing station and a maintained successively presented components in a predetermined angular orientation adjacent to the station.

Another object of the present invention is to provide a component feeding apparatus adapted for use in component processing equipment having either horizontally or vertically aligned stations.

These and other objects of the present invention will become apparent from the following description taken with accompanying drawings in which.

Figure 1:
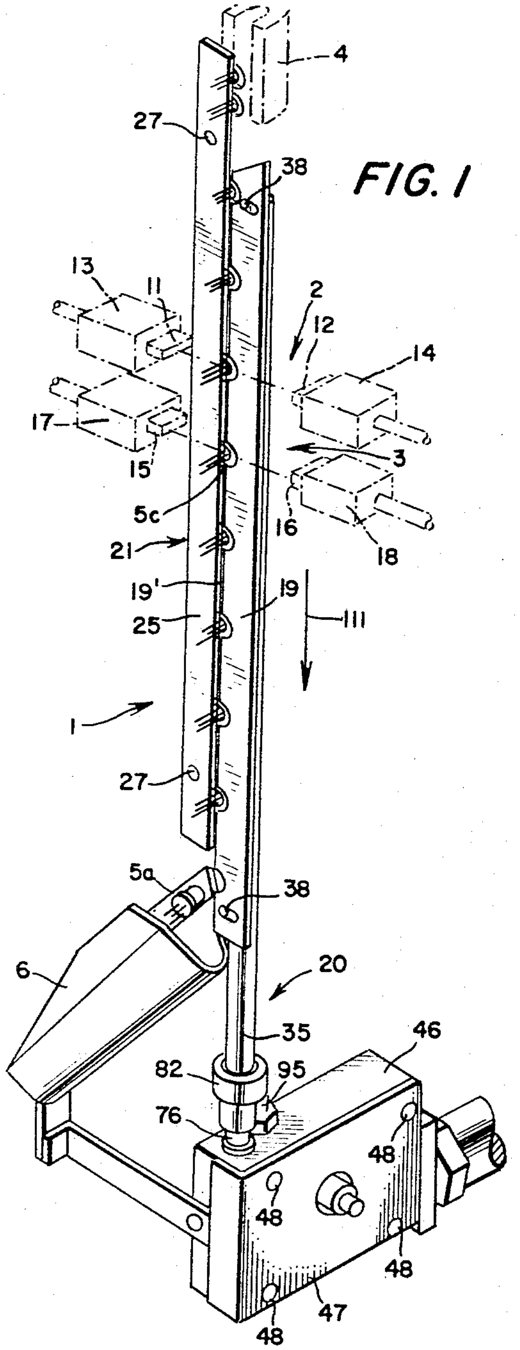
FIG. 1 is a perspective view of the component feeding apparatus of the present invention, illustrating downward movement of the transfer bar to effect transfer of components between adjacent component processing stations.
Figure 2:
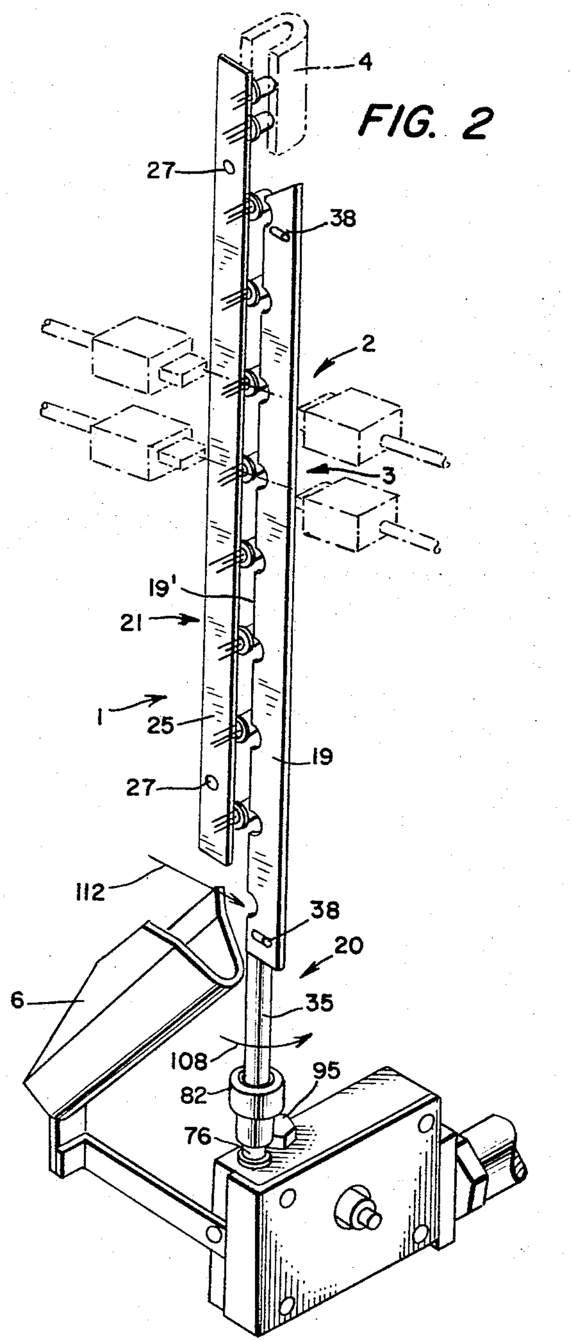
FIG. 2 is a view similar to FIG. 1, but showing the transfer bar being removed from engagement with the components.

The electrical component feeding apparatus of the present invention, generally indicated as 1, is particularly adapted for use for component handling and processing equipment having any desired number of vertically aligned component processing stations, such as indicated at 2 and 3; a gravity feed chute, indicated in phantom at 4, which forms a supply of components 5; and means, such as a chute 6, for receiving components after processing thereof. Any suitable means such as a friction detent, not shown, may be employed to retain components 5 within chute 4 until removed therefrom by the feeding apparatus in the manner hereinafter described.

Feeding apparatus 1 may be employed with electrical components of varying design but for purposes of illustration components 5 are shown, particularly in FIGS. 5 through 9, as including a cylindrical body portion 7, an enlarged circular cap portion 8, and a plurality of leads 9 which extend axially from the outer surface 10 of cap portion 8.

The individual processing stations may be employed to perform any desired processing operation, such as lead straightening, lead cutting or component testing. For purposes of illustration, however, station 2 is shown as performing a component lead straightening operation and as generally including a straightening die 11 and comb 12. Die 11 and comb 12 may be mounted within guide housings 13 and 14 for reciprocation transversely of the line of travel of components 4, illustrated in FIG. 1. Station 3 is shown as performing a component lead cutting operation and as generally including a cut-off die 15 and blade 16, which are mounted for reciprocation within guide housing 17 and 18, respectively. Suitable means, such as pneumatically operated cylinders, not shown, may be provided to control operation of stations 2 and 3, when successive components are disposed adjacent thereto in the manner more completely hereinafter discussed. The specific structure of stations 2 and 3 forms no part of the present invention and are therefore shown diagrammatically only for the purpose of the illustration of the operation of the feeding apparatus of the present invention.

Referring particularly to FIGS. 1 through 9, it will be seen that feeding apparatus 1, includes a rigid transfer bar 19; a transfer bar feed mechanism, generally indicated at 20; and a guide assembly, generally indicated at 21. To facilitate understanding of the operation of feeding apparatus 1, it will be noted at the outset by referring to FIGS. 1–4, that transfer bar 19 is employed to remove components successively from component supply 4, transfer the components in a predetermined orientation successively into positions adjacent component processing stations 2 and 3, and thereafter deposit the processed components in collection chute 6.

Figure 8:
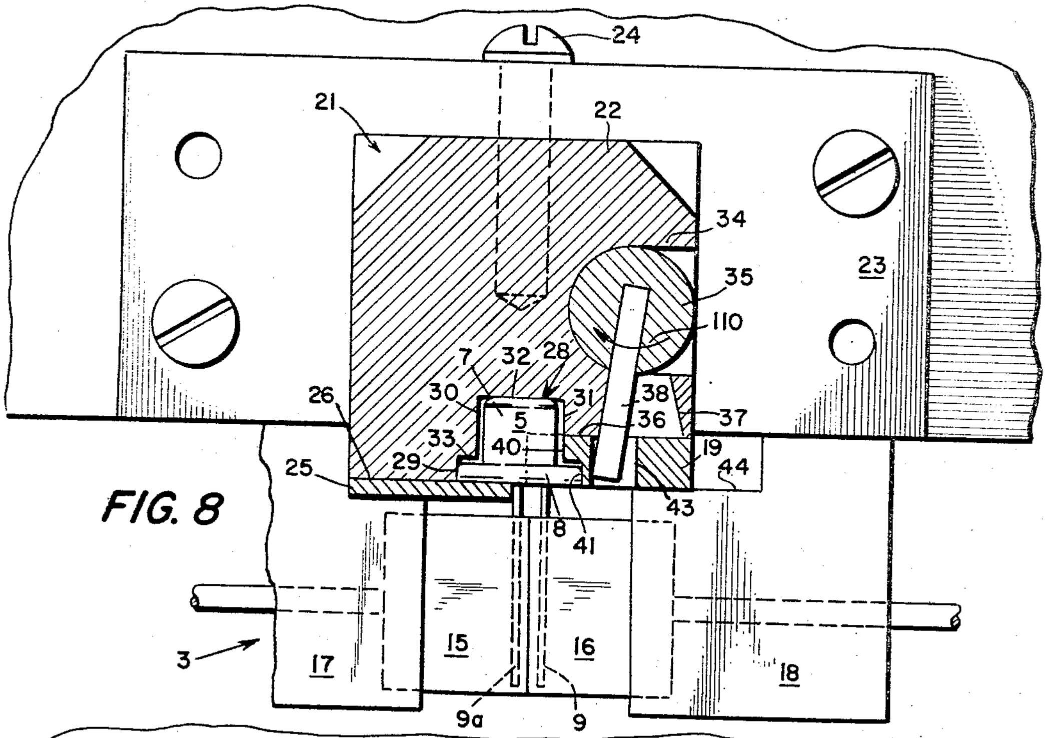
FIG. 8 is a sectional view taken generally along the line 8—8 of FIG. 4, and showing additional structural details of the apparatus of the present invention.
Figure 9:
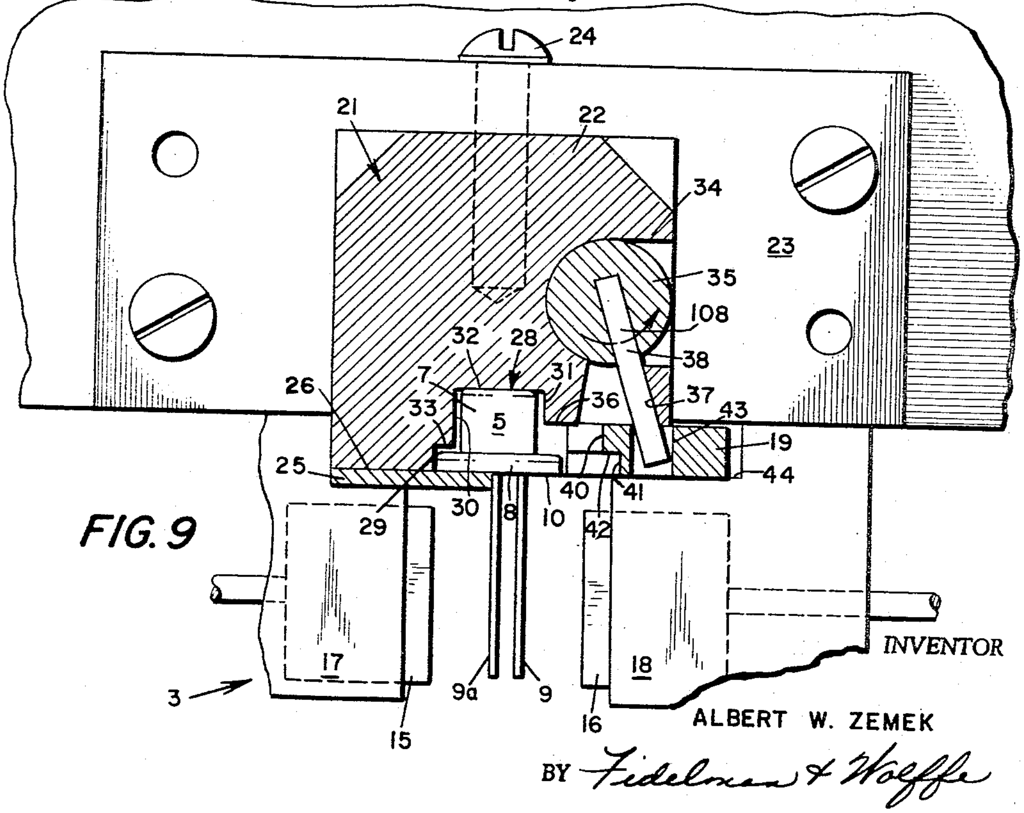
FIG. 9 is a view similar to FIG. 8 but taken along line 9—9 of FIG. 3 and showing the transfer bar out of engagement with the components.

Guide assembly 21, shown in section in FIGS. 8 and 9, comprises an elongated vertically extending guide block 22, which may be mounted on the frame work 23 of the processing equipment as by one or more screws 24, and an elongated guide spring plate 25, which is affixed to the front surface portion 26 of guide block 22 as by screws 27.

Guide block 22 is provided with a frontwardly opening vertically extending stepped recess, generally designated as 28, which is adapted to slidably receive components 5. As shown particularly in FIGS. 8 and 9, stepped recess 28 is defined by side walls 29, 30 and 31 and back walls 32 and 33, which are disposed normal and parallel to block surface portion 26, respectively. It will be appreciated that the design of stepped recess 28 depends primarily upon the design and dimensions of components 5 to be processed. When processing cylindrically shaped, three lead components of the type illustrated, I prefer to employ spring plate 25 to both orient components 5 by slidably engaging leads **9*a* and 9*b* thereof, as shown particularly in FIGS. 5 through 9, and to resiliently bias the base of the body portion 7 of the components into engagement with back wall 32 to frictionally retain the components in vertical position until positively moved by transfer bar 19, as indicated in FIGS. 8 and 9. In this case it is desirable to space side walls 29, 30, and 31 and back wall 33 out of surface contact with components 5 to prevent excessive drag thereon, as the components are drawn downwardly through recess 28 by transfer bar 19. Alternatively, when the components to be processed have either cap or body portions of rectangular cross-sectional configuration recess side walls 29 or 30 may be employed to guide and orientate the components, and spring plate 25 employed only to maintain positioning of the components by biasing the components into engagement with either of back walls 32 or 33. It will be seen that components 5 may be preoriented while still retained within supply chute 4 by extending the upper end of spring plate 25** above the exit of the supply chute, as viewed in FIGS. 1 through 4.

Guide block 22 is further provided with a vertically extending side opening recess 34, adapted to slidably and rotatably receive pivot shaft 35 of transfer bar feed mechanism 20; a recessed front surface portion 36; and a pair of vertically extending aligned openings 37, only one being shown in FIGS. 8 and 9, which connect side opening recess 34 with front surface portion 36. It will be understood that openings 37 are adapted to freely receive a pair of pivot shaft motion transmitting pins 38, thereby permitting pivot shaft 35 to be rotated with respect to guide block 22 beween the positions indicated in FIGURES 8 and 9, and to be reciprocated vertically with respect to guide block 22 between the positions illustrated in FIGURES 1 and 4.

Transfer bar 19 is illustrated as being provided along one edge 19' with a plurality of equally spaced apart component receiving semi-circular stepped cut-outs 39. Stepped cut-outs 39 are shown particularly in FIGS. 5 through 9 as being defined by curved side surfaces 40 and 41 forwardly facing flat surface 42. When transfer bar is in its component engaging position illustrated in FIG. 8, curved surface 41 is adapted to frictionally engage a portion of the peripheral surface of enlarged circular cap portion 8 of the components 5 whereby the component leads **9*a* and 9*b* are maintained in orientating engagement with spring plate 25, and the components are positively restrained against vertical movement with respect to transfer bar 19. If desired, curved surface 40 may be disposed in frictional engagement with component body portion 7 to provide additional support therefor. It will be apparent that when transfer bar 19 is moved vertically, as hereinafter discussed, cut-outs 39 force components 5 to slide within recess 28 along the path defined by spring plate 25**.

Transfer bar 19 is supported for motion with pivot shaft 35 by means of motion transmitting pins 38, which are freely received within a pair of transversely extending slot openings 43, 44 provided in bar 19. It will be understood by viewing FIGS. 8 and 9 that transfer bar 19 is constrained from other than sliding movement parallel to front surface 36 of guide block 22 during both rotational and vertical reciprocating movement of pivot shaft 35 by any suitable means, such as guide surfaces 45 provided on process station guide housings 14 and 18 (surface 45 shown only in the case of housing 18 in FIGS. 8 and 9).

Referring to the figures it will be seen that transfer bar feed mechanism 20 generally includes a housing 46 which may be affixed to the frame work of the processing equipment by any suitable means, not shown; an L-shaped cover plate 47 which is affixed to housing 46 by screws 48 threaded into housing openings 49; a gear assembly, generally designated as 50; a pivot shaft mounting assembly, generally designated as 51; and a pair of motion transmitting racks 52, 53 which are slidably received for reciprocation within housing guide slots 54, 55 respectively.

Figure 11:
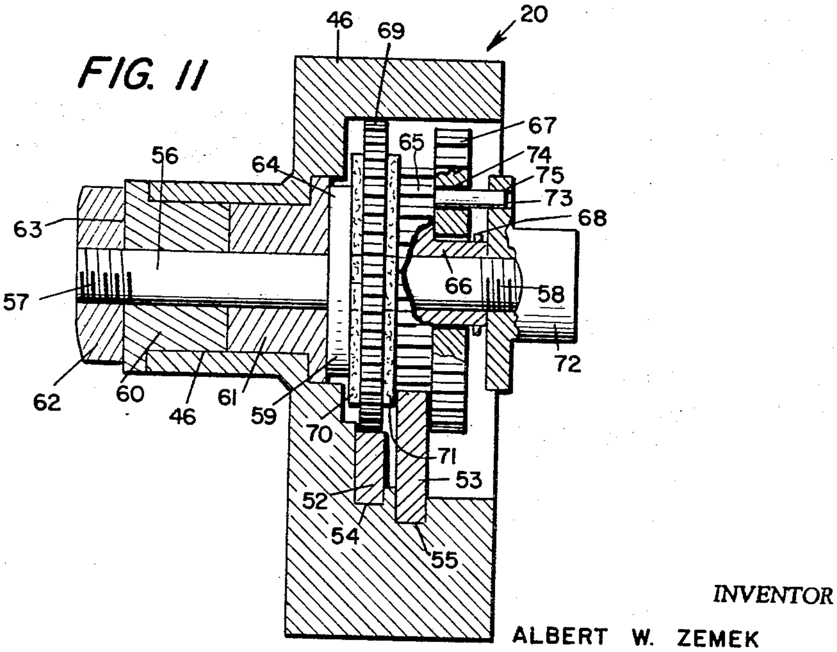
FIG. 11 is a sectional view taken generally along the line 11—11 of FIG. 10.

Referring particularly to FIG. 11 it will be seen that gear assembly 50 includes a mounting shaft 56 which is in the form of an elongated spindle having the ends thereof threaded as at 57 and 58, and a radially enlarged middle portion 59. Shaft 56 is rotatably mounted with respect to housing 46 by a two part bearing 60, 61 received within housing extension bore opening 46'. Axial motion of shaft 56 with respect to housing 46 is prevented by means of a lock nut 62 which is threadably received on threaded end portion 57 of shaft 56 and adapted to co-act with the radially enlarged shaft portion 59 to loosely or slidably clamp the end surfaces 63 and 64 of bearing part 60, 61, respectively.

Figure 10:
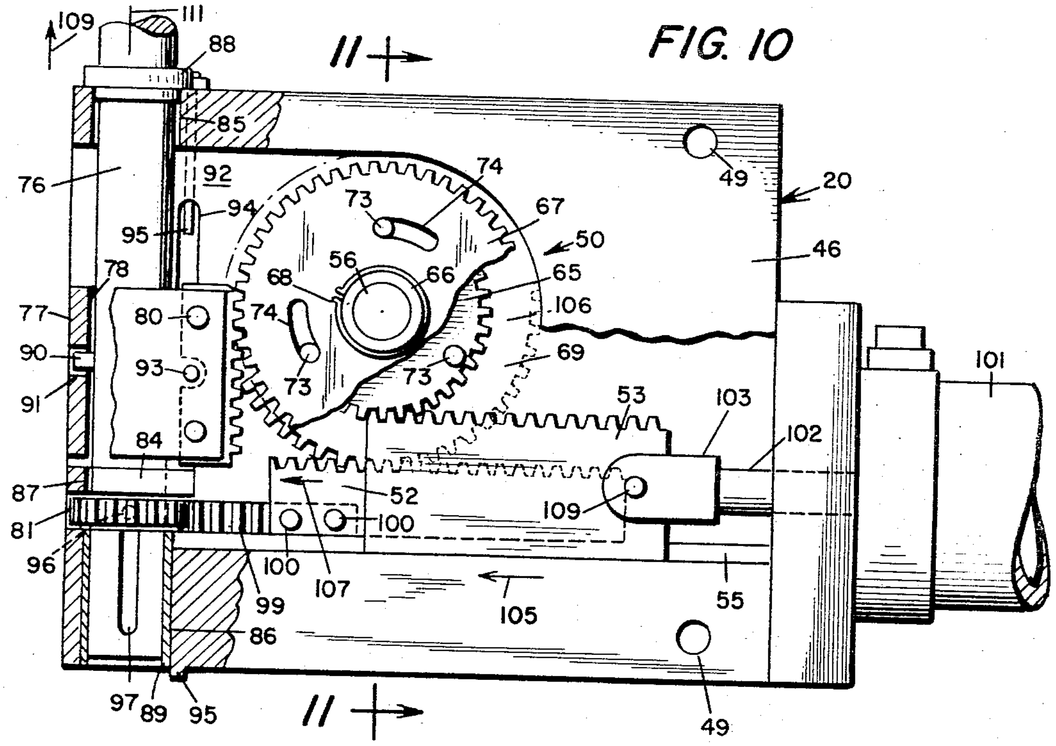
FIG. 10 is a fragmentary side elevational view of the transfer bar feed mechanism having portions broken away.

Gear assembly 50 further includes a drive gear 65, which is rotatable with shaft 56 and is provided with an integrally formed coaxially extending bearing sleeve 66; a pivot gear 67; which is journalled on bearing sleeve 66 and locked thereon by lock washer 68; a gear 69, which is rotatably supported on shaft 56 and adapted to drive rack 52; a pair of clutch plates 70 and 71; and a bearing 72 which is threadably received on shaft end portion 58. Drive gear 65, is shown in FIGS. 10 and 11 as being adapted to be driven by rack 53.

It will be apparent from viewing the construction illustrated in FIG. 11, that by threading bearing 72 onto shaft 56, the assembly including drive gear 65, clutch plate 71, rack drive gear 69 and clutch plate 70 is tightly sandwiched between bearing 72 and shaft enlarged portion 59. This specific arrangement has been found desirable for transmitting rotary motion of drive gear 65 to rack drive gear 69, since it permits slippage between the gears during a portion of the rotational cycle of drive gear 65 for the purpose hereinafter discussed.

Referring again to FIGS. 10 and 11 it will be seen that a loss motion drive is provided between drive gear 65 and a pivot gear 67 in the form of a plurality of pins 73 carried on gear 65 and coacting articulate slots 74 provided on gear 67. As indicated in FIG. 11, the free ends of pins 73 may be received within openings 75 provided in bearing 72 to prevent rotation thereof with respect to drive gear 65, which would tend to vary the frictional force exerted on clutch plates 70, 71.

The pivot shaft mounting assembly 51 is shown in FIGS. 5 through 10 and 11 as including: a lower pivot shaft 76; a shaft block 77 having a bore opening 78 adapted to loosely receive shaft 76; a rack 79, which is adapted to be affixed to block 77 by suitable means, such as pins 80; and pivot shaft rotating gear 81. Lower pivot shaft 76 may be affixed to pivot shaft 35 by any suitable means, such as shaft joining sleeve 82 and pins 83.

In FIG. 10 housing 46 and housing flange 84 are shown as having vertically aligned bore openings 85, 86, and 87, respectively, which are adapted to freely receive lower pivot shaft 76. Shaft 76 is supported for both rotary and vertically reciprocating movement with respect to housing 46 by means of upper and lower sleeve bearings 88 and 89 which are force fitted into housing openings 85 and 86, respectively.

Referring to FIGS. 5 through 7 and 10 it will be seen that shaft block 77 is coupled to shaft 76 for vertical reciprocating movement therewith by means of a pin 90 which is affixed to shaft 76 and freely received for sliding movement within a horizontally disposed block slot 91. Rotation of block 77 with respect to housing 46 is constrained by housing wall surface 92 and a pin 93 which is carried on block 77 and adapted to be slidably received within a vertically extending housing slots opening 94. It will be understood that by constructing block 77 in the manner described, the extent of rotation of pivot shaft 76 with respect to the block 77 and thus housing 46 is controlled by the length of block slot 91. Also, by viewing FIG. 10, it will be apparent that the extent of vertical reciprocation of block 77 and thus shaft 76 with respect to housing 46 is determined by the degree of rotation of pivot gear 67 which is drivingly connected to block 77 by rack 79. Alternatively, the upper and lower limits of travel of block 77 and thus shaft 76 may be adjustably controlled by means of adjustment screws 95, which are threaded into housing 46 and function to limit movement of block pin 93 within housing slot opening 94.

Pivot shaft rotating gear 81 is keyed for rotation with shaft 76 by means of a pin, shown in dotted lines as at 96, which is slidably received within axially extending shaft slot recess 97. It will be apparent that vertical movement of gear 81 is constrained during vertical movement of shaft 76 by the upper end of lower housing bearing 89 and a disc bearing 98, which is disposed between the gear 81 and housing flange 84. From viewing FIGS. 5 through 7 and 10 it will be understood that gear 81 is adapted to be engaged by a rack extension 99 which is affixed to reciprocating rack 52 by suitable means, such as metal screws 100.

Operation of the transfer bar feed mechanism 20 is controlled by a suitable pneumatic cylinder 101 having a reciprocating plunger 102, provided at one end with a clevis 103. Clevis 103 is pin connected to rack 53 as at 104, whereby upon actuation of the cylinder 101, rack 53 is forced to reciprocate within housing slot 55.

From the foregoing it will be understood that when rack 53 is forced by cylinder 101 to move in the direction indicated by arrow 105 from a starting or reference position viewed in FIG. 10, drive gear 65 and gear 69, which is drivingly connected to gear 65 through clutch plates 70 and 71, are driven for rotation in a direction indicated by arrow 106. Upon rotation of gear 69, rack 52 and rack extension 99 are forced to move in the direction of arrow 107, whereby effecting rotation of shaft rotating gear 81 and thus lower pivot shaft 76 and pivot shaft 35 in the direction indicated by arrow 108 in FIGS. 2, 6 and 9. Rotation of the assembly including gear 81 and shafts 35 and 76 is terminated upon engagement of shaft pin 90 with one end of block slot 91, as viewed in FIG. 6, whereafter gear 69 is permitted to idle or slip with respect to gear 65 due to the frictional drive arrangement including clutch plates 70 and 71. Due to the lost motion drive between gear 65 and pivot gear 67, the latter gear is not caused to rotate until rotation of the assembly including gear 81 and shafts 35 and 76 has been terminated in the manner described. Thereafter, gear 67 is driven in the direction indicated by arrow 106 in FIG. 10, whereby rack 79, and thus the assembly including pivot block 77 and shafts 35 and 76, are forced to move upwardly in the direction indicated by arrow 109, as viewed in FIGS. 3 and 7 and 10, until the completion of the stroke of the cylinder plunger 102.

Figure 4:
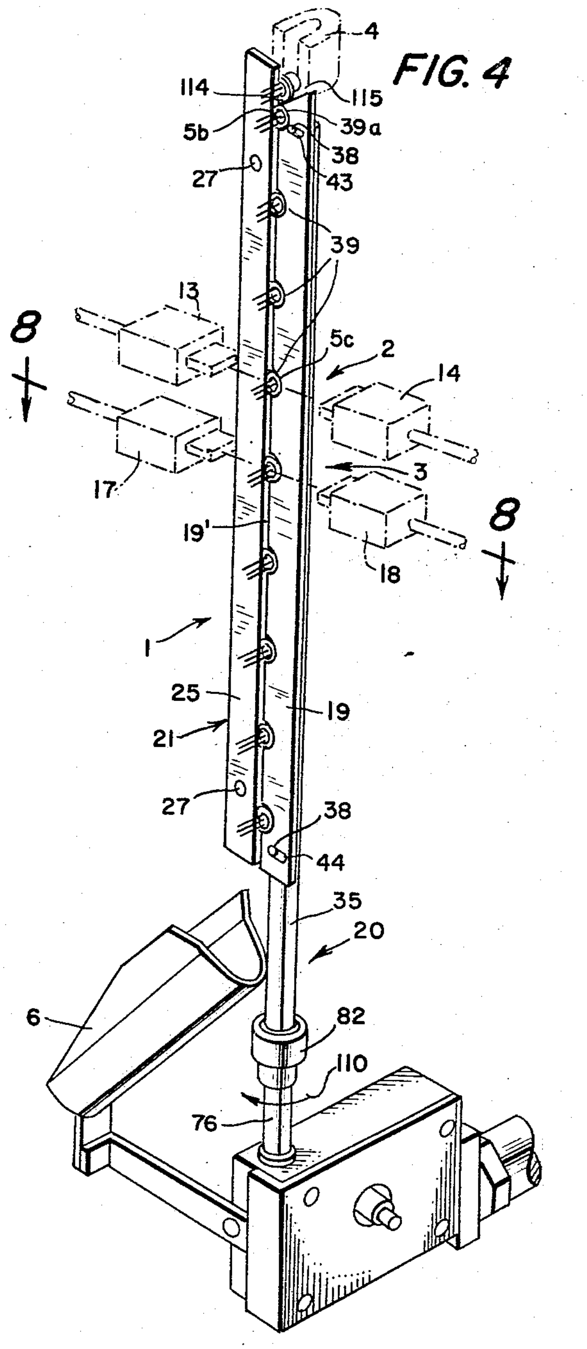
FIG. 4 is a view similar to FIG. 3 but showing the transfer bar in component engaging position.

Upon return of cylinder plunger 102 to its starting position, gear 69 is initially frictionally driven by gear 65 to return rack 52 and rack extension 99 to the position illustrated in FIG. 10, whereby the assembly including gear 81 and shafts 35 and 76 is rotated in the direction indicated by arrow 110 until stopped in its initial rotational position, as viewed in FIGS. 4 and 8, by the engagement of shaft pin 90 with the other end of the block slot 91. Gear 69 is thereafter permitted to idle or slip with respect to gear 65 due to the friction drive connection discussed above. Thereafter, the loss motion drive once again drivingly connects gear 67 to drive gear 65, whereby forcing the assembly including shaft block 77 and shafts 35 and 76 to move downwardly in a direction indicated by arrow 111 viewed in FIGS. 1, 5, and 10 to its starting position.

Considering the operation of the transfer bar feed mechanism, it will be apparent that the assembly, including shaft block 77 and shafts 35 and 76, is displaced from and returned to its initial position, illustrated in FIG. 10, once during each cycle of operation described above, and that the length of travel or extent of vertical displacement of such assembly may be adjusted by varying the stroke of cylinder plunger 102. Alternatively, cylinder 101 may be of the pressure overload release variety, so as to prevent damage to the gear train including rack 53, gear 65, gear 67 and block rack 79, and the extent of vertical displacement adjustably controlled by adjustment screws 95. However, by whatever means employed it will be understood that the vertical displacement is adjusted to correspond exactly with a multiple of the spacing between transfer bar stepped openings 39 to insure proper reengagement of the transfer bar with components 5, which are retained in position by spring plate 25, when pivot shaft 35 is rotated in the direction indicated by arrow 110 to return the transfer bar to the position illustrated in FIG. 4 in the manner hereinafter discussed.

Figure 3:
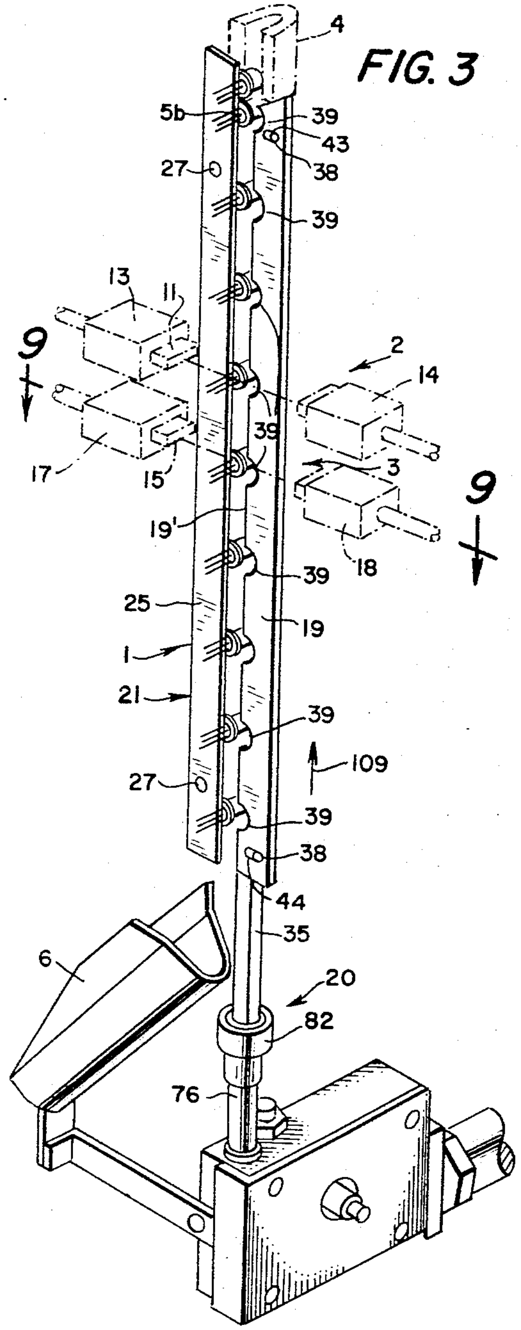
FIG. 3 is a view similar to FIG. 2, but showing the transfer bar in its elevated position prior to re-engagement with the components.
Figures 5, 6, 7:
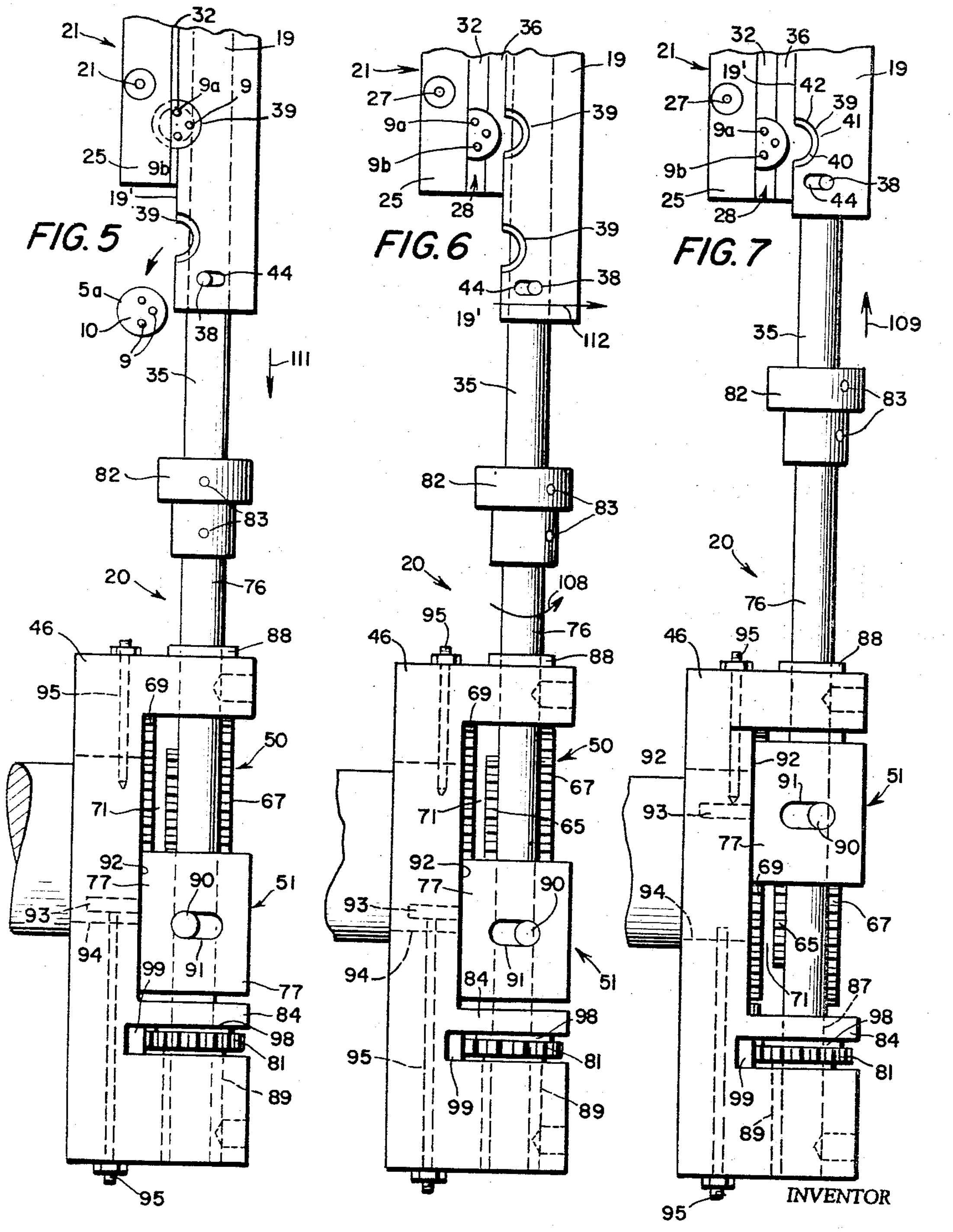
FIG. 5 is a fragmentary front elevational view showing the transfer bar and transfer bar feed mechanism with cover plate removed, in the position illustrated in FIG. 1.
FIG. 6 is a fragmentary front elevational view showing the transfer bar and transfer bar feed mechanism with cover plate removed in the position illustrated in FIG. 2.
FIG. 7 is a fragmentary front elevational view showing the transfer bar and transfer bar feed mechanism with cover plate removed in the position illustrated in FIG. 3.

From the foregoing it will be apparent that upon downward movement of the pivot shaft 35 in the direction of arrow 111, when in the rotational position shown in FIGS. 1, 5 and 8, the transfer bar 19 is forced to move downwardly, whereby a series of spaced apart components 5 retained within stepped cut-outs 39 are transferred with respect to the processing stations 2 and 3 and the first processed component of the series 5*a*, which has been moved past the lower end of spring plate 25, is discharged from the transfer apparatus by gravity to chute 6. Upon completion of vertical movement of transfer bar 19, pivot shaft 35 is rotated in the direction indicated by arrow 108 to effect horizontal movement of transfer bar 19 parallel to front surface 36 of guide block 22, as indicated by arrow 112 in FIGS. 2 and 6, into the position illustrated in FIG. 9. In this position transfer bar 19 is spaced from engagement with components 5; such components being retained in position by the action of spring plate 25. FIG. 3 illustrates the next step of transfer bar motion, wherein the pivot shaft 35 is moved upwardly in the direction of arrow 109 viewed in FIG. 3 to slide transfer bar 19 into its upper position. Thereafter, as viewed in FIG. 4, pivot shaft 35 is rotated in the direction indicated by arrow 110 to force transfer bar 19 to slide in the direction indicated by arrow 113 and be returned to the component engaging position indicated in FIG. 8. Slight adjustment of screws 95 may be necessary from time to time to compensate for wear of mechanism 20 to insure proper engagement of the transfer bar with the components.

By referring to FIG. 4 it will be seen that when transfer bar 19 is moved in the direction indicated by arrow 113, a component separator edge portion 114, defined by inclined cam surface 115 and the upper stepped opening 39*a*, acts to separate the bottom component 5*b* from the series of components retained within guide chute 4. Thus it will be apparent that upon subsequent downward movement of transfer bar 19, component 5*b* will be withdrawn from chute 4 against the bias of a suitable component retaining means, such as a spring detent, not shown.

In the preferred embodiment of the transfer apparatus disclosed, component processing occurs only once during each full cycle of operation of transfer bar 19, during which time the transfer bar 19 is stationary and is forced into positive engagement with the components to accurately position same adjacent to the respective processing stations. Preferably, processing of the components at stations 2 and 3 is effected at the completion of each operational cycle when the transfer bar is in its down or lower position illustrated in FIG. 1, which corresponds to the retracted or starting position of cylinder plunger 102 mentioned above. Any suitable control circuit, not shown, may be provided to effect operation of processing stations 2 and 3 during a momentary dwell in the actuation of transfer bar feed mechanism control cylinder 101 at the end of each transfer cycle.

For purposes of the present invention the respective processing stations may be relatively spaced apart any multiple of the distance between transfer bar openings 39; there accordingly being required one or more cycles of operation of transfer bar 19 to move a particular component between adjacent stations. In the apparatus illustrated in the drawings it will be apparent, by referring to FIGS. 1 and 4, that one complete operational cycle is required to move a given component, e.g., component 5*c*, between adjacent stations 2 and 3.

Alternatively by the utilization of suitable limit switches, not shown, operation of cylinder 101 may be periodically stopped, and processing stations 2 and 3 simultaneously actuated, during that portion of the return stroke of plunger 102 which effects movement of transfer bar 19 downwardly between the positions illustrated in FIGS. 4 and 1, thereby permitting any given component to be processed at several different stations during each cycle of transfer bar operation. In this case it will be understood that the overall vertical displacement of transfer bar would be equal to or greater than twice the distance between transfer bar openings 39 and each step wise displacement would be equal to the distance between such openings. However, this latter mode of operation requires a more complex control circuit to insure accurate placement of the components adjacent to the processing stations.

From the above discussion it will be apparent that during each full cycle of operation of the transfer bar a component is withdrawn from supply chute 4, a processed component is deposited on collection chute 6, and that the components transferred by the transfer bar are successively presented and maintained in a predetermined orientation adjacent to processing stations 2 and 3. While only two processing stations have been illustrated, it will be appreciated that any desired number may be provided and that the spacing between adjacent stations need not be equal as long as the spacing between stations is a multiple of the distance between transfer bar openings 39. Also it will be seen that apparatus 1 may be employed with component processing equipment wherein the line of component travel between processing stations is other than vertical, i.e., horizontal or at any desired angle to between vertical and horizontal, since operation of spring plate 25 and transfer bar 19 is independent of their physical orientation.

Since various modifications of the present invention will occur to those skilled in the art in view of the foregoing description, I wish to be limited only by the appended claims.

What is claimed is:

1. An electrical component feeding apparatus for use in combination with a component processing station, including means adapted to guide components along a path of travel past said station in a predetermined component processing orientation and means adapted to positively transfer said oriented components along said guide means and to sequentially position said components adjacent said station, said transfer means including a transfer bar having a plurality of component engaging surface portions defined by cut-outs equally spaced apart along one edge of said transfer bar aligned with said path of travel and means to move said transfer bar with respect to said guide means in such a manner that said surface portions are sequentially moved from a first position in a first direction aligned with said guide means to transfer said components, a predetermined distance along said path of travel, withdrawn from engagement with said components, moved in a direction opposite to said first direction a distance equal to said predetermined distance and returned to said first position in engagement with said components, and said surface portions being adapted to positively maintain said components in orientating engagement with said guide means during movement of said surface portions in said first direction and during processing of said components at said processing station.

2. An electrical component feeding apparatus for use in combination with a component processing station, including means adapted to guide components along a path of travel past said station in a predetermined component processing orientation and means adapted to positively transfer said oriented component along said guide means and to sequentially position said components adjacent said station, said transfer means including a transfer bar having a plurality of component engaging means equally spaced along said path of travel and means to move said transfer bar with respect to said guide means in such a manner that said engaging means are sequentially moved from a first position in a first directional aligned with said guide means to transfer said components a predetermined distance along said path of travel, withdrawn from engagement with said components, moved in a direction opposite to said first direction a distance equal to said predetermined distance, and returned to said first position in engagement with said components, and said guide means includes means defining a component receiving recess aligned with said path of travel and a spring plate adapted to resiliently maintain said components in relatively spaced apart positions within said recess when said engaging means are removed from engagement with said components.

3. A component feeding apparatus according to claim 2, wherein said spring plate is provided with a component guiding edge surface disposed in alignment with said path of travel, and said component engaging means when moved in said first direction are adapted to maintain said components in engagement with said edge surface to maintain said components in said predetermined processing orientation.

4. A component feeding apparatus according to claim 2, wherein said component receiving recess is adapted to guide said components during transfer thereof in a predetermined component processing orientation.

5. An apparatus for use in feeding electrical components with respect to at least one component processing station, each of said components having a body portion and leads extending therefrom, which comprises means adapted to guide said components along a path of travel past said processing station in a predetermined component processing orientation, said guide means including means defining a component body portion receiving surface aligned with said path of travel and a spring plate disposed adjacent said surface and tending to resiliently maintain said components in engagement with said surface to thereby normally prevent motion of said components along said path of travel, a component transfer bar, said bar having a plurality of equally spaced apart cut-outs disposed along one edge thereof aligned with said path of travel, and means to move said bar with respect to said guide means, whereby said cut-outs are sequentially moved in a first direction parallel to said guide means to transfer said components a predetermined distance along said path of travel against the bias of said spring plate, withdrawn from engagement with said components, moved in a second direction opposite to said first direction a distance equal to said predetermined distance and again placed in engagement with said components.

6. The apparatus of claim 5 wherein said component body portion is of circular cross-section and at least two leads extend axially from one end surface of said body portion, said spring plate includes a component lead edge guide surface, each of said cut-outs includes a curved surface portion adapted to be disposed concentrically of said body section, and said curved surface portion is adapted to frictionally engage said body portion when said cut-outs are in component engaging position and moved in said first direction, whereby said two component leads are maintained in orienting engagement with said lead edge guide surface of said spring plate.

7. The apparatus of claim 5, wherein said component body portion includes relatively large and relatively small diameter parts of circular cross-sectional configuration and said cut-outs are defined in part by a pair of curved surfaces disposed concentrically of said parts, at least one of said curved surfaces being adapted to frictionally engage a corresponding body portion when said cut-outs are in component engaging position and moved in said first direction.

8. The apparatus of claim 7, wherein said one curved surface is adapted to maintain at least a pair of leads of a component engaged thereby in orientating engagement with said spring plate when said cut-outs are in component engaging position and moved in said first direction.

9. The apparatus of claim 5, wherein said transfer bar is supported for sliding rectilinear motion with respect to said surface defining means, and said transfer bar moving means includes a member supported for reciprocation along and rotational movement about an axis aligned with said path of travel, means to move said member, and means to operably connect said member to said bar, whereby said cut-outs are moved parallel to said path of travel upon reciprocation of said member and said cut-outs are removed from and again placed in engagement with said components when said member is rotated in first and second directions, respectively.

10. The apparatus of claim 9, wherein said member moving means includes a first gear means, a first gear train including friction clutch means for connecting said first gear means to said member, and a second gear train including lost motion drive means for connecting said first gear means to said member, whereby upon rotation of said first gear means in a first direction said first gear train is adapted to effect rotation of said member to remove said cut-outs from engagement with said components and thereafter said second gear train is adapted to reciprocate of said member so as to move said cut-outs in said second direction, and whereby upon rotation of said first gear means in said second direction said first gear train is adapted to rotate said member to again place said cut-outs in component engaging position and thereafter said second gear train is adapted to reciprocate said member so as to move said cut-outs in said first direction.

11. The apparatus of claim 10, wherein means are provided to adjustably control reciprocating movement of said member, whereby said predetermined distance of component movement may be varied.

12. An apparatus according to claim 5, wherein said path of component travel is vertical.

13. In electrical component handling and processing equipment having a supply of components from which one component at a time may be withdrawn and at least one component processing station spaced from said supply, the provision of a component feeding apparatus including in combination means adapted to guide components along a path of travel from said supply to said station in a predetermined component processing orientation; and transfer means adapted to remove components one at a time from said supply, positively transfer said removed components in a relatively spaced apart relationship along said path of travel inclined with respect to horizontal, and sequentially position said components adjacent said station, said guide means including resilient means tending to maintain said removed components stationary along said path of travel until positively transferred by said transfer means.

14. In electrical component handling and processing equipment having means forming a supply of components from which one component at a time may be withdrawn, at least one component processing station spaced from said supply, and means to receive processed components, the provision of a component feeding apparatus including in combination means adapted to guide components along a vertical path of travel from said supply past said station to a point adjacent said receiving means, said guide means being adapted to maintain said components in a predetermined processing orientation at least during that portion of component travel past said station; and transfer means adapted to remove components one at a time from said supply, positively transfer said removed components in a relatively spaced apart relationship along said path of travel, sequentially position said components adjacent said station to permit processing thereof and sequentially deposit said processed components in said receiving means.

References Cited

UNITED STATES PATENTS

| | | | |
|---|---|---|---|
| 2,745,167 | 5/1956 | Cross | 198—19 X |
| 2,861,676 | 11/1958 | Rasmussen | 198—19 X |
| 3,223,223 | 12/1965 | Fuhrmann | 198—221 X |

EVON C. BLUNK, *Primary Examiner.*

EDWARD A. SROKA, *Examiner.*